United States Patent
Gaertner et al.

(10) Patent No.: US 9,448,896 B2
(45) Date of Patent: Sep. 20, 2016

(54) TORN WRITE MITIGATION

(71) Applicant: Seagate Technology LLC, Cupertino, CA (US)

(72) Inventors: Mark Allen Gaertner, Vadnais Heights, MN (US); Jon Trantham, Chanhassen, MN (US); Vidya Krishnamurthy, Eden Prairie, MN (US); Steve Faulhaber, Bloomington, MN (US); Yong Yang, Edina, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 197 days.

(21) Appl. No.: 13/961,755

(22) Filed: Aug. 7, 2013

(65) Prior Publication Data
US 2015/0046747 A1    Feb. 12, 2015

(51) Int. Cl.
G06F 11/00    (2006.01)
G06F 11/16    (2006.01)
G06F 11/14    (2006.01)
G06F 11/20    (2006.01)

(52) U.S. Cl.
CPC ....... *G06F 11/1666* (2013.01); *G06F 11/1441* (2013.01); *G06F 11/2015* (2013.01)

(58) Field of Classification Search
CPC .. G06F 1/30; G06F 11/1666; G06F 11/1435; G06F 11/1441
See application file for complete search history.

(56) References Cited

U.S. PATENT DOCUMENTS

| | | | |
|---|---|---|---|
| 5,195,100 A * | 3/1993 | Katz et al. ............... | 714/22 |
| 5,519,831 A | 5/1996 | Holzhammer | |
| 5,774,643 A * | 6/1998 | Lubbers ............... | G06F 11/1076 711/114 |
| 5,889,933 A * | 3/1999 | Smith ................. | G06F 1/30 714/20 |
| 6,295,577 B1 | 9/2001 | Anderson et al. | |
| 7,266,724 B2 * | 9/2007 | Denda et al. .............. | 714/24 |
| 7,941,692 B2 * | 5/2011 | Royer et al. ............... | 714/6.1 |
| 8,289,801 B2 | 10/2012 | Smith et al. | |
| 8,700,951 B1 * | 4/2014 | Call .................... | G06F 11/1441 714/22 |
| 8,938,641 B2 * | 1/2015 | Veal .................... | G06F 11/1474 711/114 |
| 2006/0075185 A1 | 4/2006 | Azzarito | |
| 2009/0031098 A1 * | 1/2009 | Sartore ........................ | 711/162 |
| 2009/0172466 A1 * | 7/2009 | Royer et al. .................. | 714/6 |
| 2010/0061207 A1 * | 3/2010 | Trantham .................... | 369/53.1 |
| 2010/0106896 A1 | 4/2010 | Bildgen et al. | |
| 2010/0332897 A1 * | 12/2010 | Wilson ........................ | 714/14 |
| 2011/0058440 A1 * | 3/2011 | Smith et al. ................ | 365/229 |
| 2011/0138221 A1 * | 6/2011 | Hanaoka et al. ............ | 714/6.1 |
| 2013/0044386 A1 * | 2/2013 | Sato ............................ | 360/15 |
| 2013/0067179 A1 | 3/2013 | Paleologu et al. | |
| 2013/0097367 A1 | 4/2013 | Flynn et al. | |
| 2013/0110789 A1 | 5/2013 | Braam et al. | |
| 2014/0310483 A1 * | 10/2014 | Bennett .................... | 711/154 |

FOREIGN PATENT DOCUMENTS

WO    WO2011101917    8/2011

OTHER PUBLICATIONS

Office action from KR Application No. 10-2014-0099744 dated Apr. 29, 2015, 15 pages.

* cited by examiner

*Primary Examiner* — Joseph Kudirka
(74) *Attorney, Agent, or Firm* — Hollingsworth Davis, LLC

(57) ABSTRACT

Torn write mitigation circuitry determines if a write operation to memory is in progress at or about a time of power loss. In response to the write operation being in progress at or about the time of the power loss, the torn write mitigation circuitry causes torn write data and metadata to be stored to a non-volatile cache. The torn write data comprise data left in a degraded or uncorrectable state as a result of the loss of power. The metadata describe the torn write data.

19 Claims, 7 Drawing Sheets

TORN WRITE MITIGATION

SUMMARY

Some embodiments of the disclosure relate to methods, devices and systems for "torn-write" or "write-splice" mitigation in a data storage device. Some methods include detecting a loss of power to memory. In response to a write operation to the memory being in progress at or about the time of the power loss, storing torn write data to a non-volatile cache. The torn write data comprise data left in a degraded or uncorrectable state as a result of the loss of power. Additionally, metadata is stored in the non-volatile cache that describe the torn write data.

Some embodiments involve an apparatus that includes torn write mitigation circuitry. The torn write mitigation circuitry is configured to determine if a write operation to the memory is in progress at or about a time of a power loss to the memory. In response to the write operation being in progress at or about the time of the power loss, the torn write mitigation circuitry causes torn write data and metadata to be stored to a non-volatile cache. The torn write data comprise data left in a degraded or uncorrectable state as a result of the loss of power. The metadata describe the torn write data.

Some embodiments are directed to a data storage system that includes a memory and a non-volatile cache. The system includes power loss detection circuitry configured to detect a loss of power to the memory. The system further includes torn write mitigation circuitry configured to determine if a write operation to the memory is in progress at or about the time of a power loss. In response to the write operation being in progress at or about the time of the power loss, the torn write mitigation circuitry causes torn write data and metadata to be stored to the non-volatile cache. The torn write data comprise data left in a degraded or uncorrectable state as a result of the loss of power. The metadata describe the torn write data.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

Figure 1:
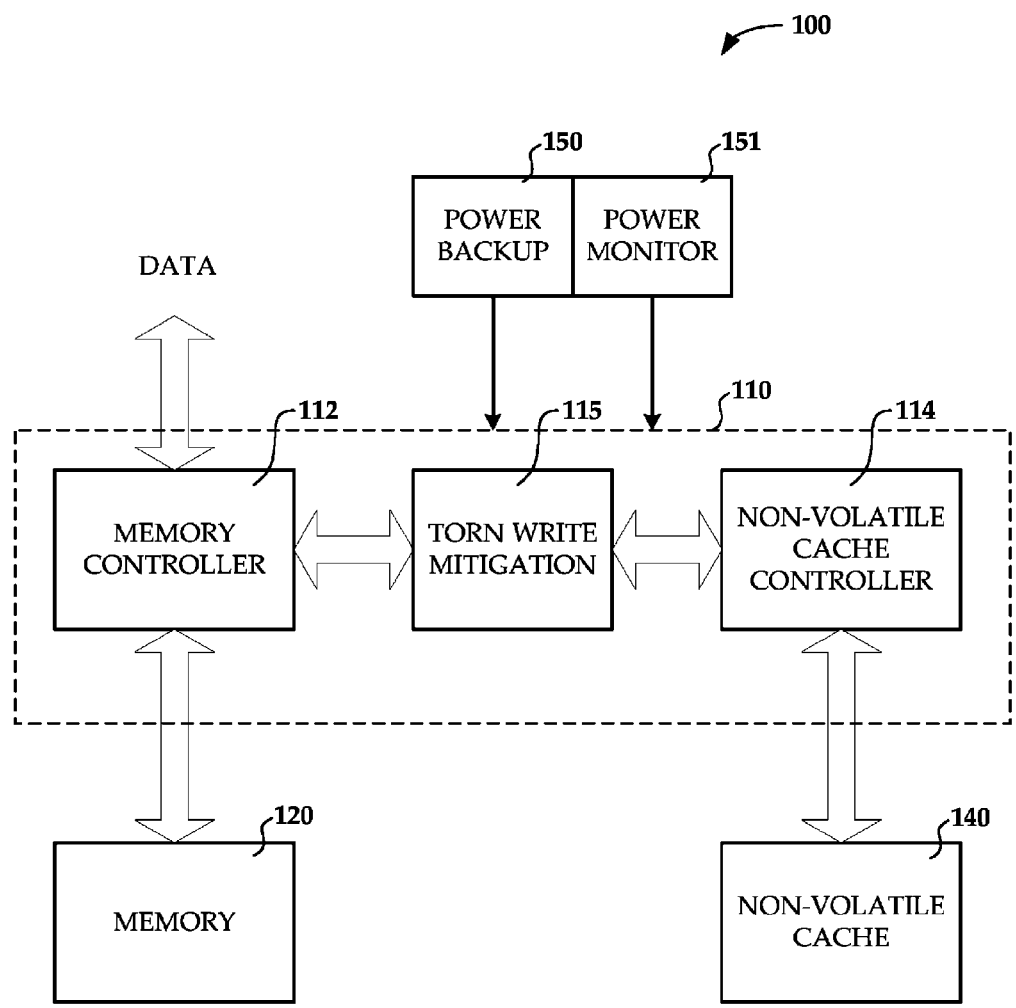
FIG. 1 is a block diagram of a system capable of implementing a torn write mitigation process in accordance with some embodiments.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

During a write to the non-volatile memory of a data storage device, e.g., the magnetic media of a hard disk drive (HDD) or hybrid hard drive (HHD), or the electronic non-volatile memory (e.g. NAND flash) of a solid-state drive (SSD) or HHD, an unexpected loss of supplied power, e.g., power supplied from the host to the non-volatile memory of the data storage device may result in unrecoverable or degraded data being left on the media. For example, if a write operation is being executed in order to write (program) data to memory at or about the time that a power loss occurs, the write operation to the memory media currently being executed may not be able to be completed due to lack of power. Even if the data are written to the memory, the data may not yet be validated. For example, in a hard disk drive (HDD) the data may have been written off-track, and the drive may not be able to rotate to the next servo wedge in order to confirm on-track alignment. For another example, in a solid-state drive (SSD) the storage cells on NAND flash may not have reached their intended charge level, thus preventing recovery of the data when the data are read from the memory. These failure conditions are collectively referred to as "torn writes," although other similar terms and descriptions are often used in the industry to describe the same phenomena, such as "write-splices," "interrupted writes," "incomplete writes" or "partial writes." The terms "at the time of power loss" and "at or about the time of power loss" as both used herein to refer to a time period before, during, and/or after a loss of power to memory that can result in torn write data.

It is not always possible to detect power loss early enough so that a sufficient amount of power remains available to complete the write operation to the memory being actively written. This is even more aggravated with a transition from memory having short sector sizes, e.g., 512 bytes, to memory having larger sector sizes, e.g., 4096 bytes. The loss of power often means that there is insufficient time for any error recovery to occur and the erroneous sector or sectors may be left in error. Furthermore, errors conditions such as off-track errors may be exacerbated by the loss of power.

In cases where the storage device is a hard disk drive, data errors may arise due to horizontal and/or vertical displacement of the head as the power loss occurs. At the time of power loss, the degradation of supplied voltage can affect the system in myriad ways leading to degradation of the stored data. For example, voltage degradation might lead to the actuator moving off-track, and data written off-track can be compromised, even to the point of being unrecoverable.

In some configurations of, it may be advantageous to discontinue write operations in progress to a particular memory, e.g., multi-level cell (MLC) flash, and to store the torn write data in a different configuration of the same type of memory and/or in a different type of memory. As one example, suppose the memory is MLC flash, storing the torn write data in a different configuration could involve storing the torn write data into MLC flash cells used in single level mode (single mode level cell (SMLC) flash). As another example, suppose the memory is MLC flash, storing the torn write data in a more different type of memory could involve storing the torn write data in spin torque random access memory (STRAM).

The detection of power loss may rely on the voltage droop (rate of loss) behavior of the system's power supplies. This voltage-droop behavior may vary depending on power supply or host system manufacturer, leading to uncertainty in the amount of time remaining before errors occur if an active write operation is in progress during power loss. The system described herein is generally insensitive to the rate of voltage-droop.

In many implementations, the data storage devices store each host logical block as a part of a larger memory sector of the memory. For example, each logical block, e.g., logical blocks from the host or elsewhere, may be 512 bytes, yet is stored in a 4 KB disk sector or flash page, typically grouped along with seven other host logical blocks. If memory sectors and logical blocks being stored to the memory are the same size, power loss may only result in unrecoverable sectors for the logical block being actively written. However, if the data storage device has a memory sector or page size that is larger than the logical block size being stored, a write operation could result in a torn write affecting not only the logical block being written, but also the other logical blocks being stored within the same memory sector (or page). This additional risk to data "at rest" is especially undesirable.

As mentioned, a torn write condition can happen when a power loss occurs after some of the logical blocks associated with the write operation have been written to the memory but have not yet been validated. These logical blocks may not be directly associated with an outstanding write command, especially since they have already been written to the memory. Some logical blocks from the host (or elsewhere) associated with the write operation may not have been written to the memory yet. These logical blocks would be associated with an outstanding write command. A torn write may result in corruption of the logical blocks that are not associated with an outstanding write command, which is undesirable. The term "torn write data" generically refers to data that may be left in a degraded or uncorrectable state as a result of the loss of power including: 1) blocks (or other units) of data associated with a write operation that have been written to the memory and not yet validated, 2) blocks (or other units) of data associated with the write operation that have not yet been written to the memory, 3) blocks (or other units) of data that were partially written to the memory, 4) associated blocks (or other units) of data that are grouped with a block of data being written at or about the time the power is lost, wherein the associated logical blocks would need to be rewritten as a result of the interrupted writing of the block of data being written, and 5) blocks (or other units) associated with memory writes resulting from internal data storage device background activity in progress at or about the time of host power loss, for example, garbage collection in a SSD/HHD, internal data-storage device or system files/metadata updates, etc.

Embodiments described herein involve approaches for eliminating or greatly reducing unrecoverable errors caused by torn writes. According to these embodiments, in response to detection of the loss of power, torn write data, including data that may be left in a degraded or uncorrectable state as a result of the loss of power, are saved to a non-volatile cache along with metadata that describe the saved sectors.

A non-volatile cache refers to a storage media that is more suitable for storage at the time of power-loss. In a hard disk drive, a non-volatile cache is often embodied as an electronic NOR or NAND flash memory. In a solid-state drive, a non-volatile cache is often embodied as a NAND flash, preferably pre-erased, often operating in single-level-charge (SLC) mode. The memory can be a separate die or can be a dedicated region or partition of main memory. It could also be an entirely different type of memory, such as a magnetic random access memory (MRAM), spin torque random access memory (STRAM), phase change memory (PCM) or any other type of memory more suitable for rapid storage of data the time of power loss.

The metadata being stored at the time of loss generally include descriptive information about the torn write data. Metadata may include, for example, address information about the torn write data, for example the location of the memory (e.g. a logical or physical address) that identifies where data blocks were intended to be written prior to the loss of power or the address of where data blocks are to be written when power is reapplied. Metadata may include the quantity of torn write data. For skip-write operations, metadata may include the skip mask pattern. Metadata may also include error detection or correction codes for the torn write data or for the metadata.

FIG. 1 is a block diagram of a data storage device 100 capable of mitigating torn write errors. In some cases, logical blocks of data, e.g., host data, to be stored to memory 120 are transferred to a data storage controller 110. The controller 110 includes a memory controller 112 configured to control data transfers to and from a memory 120, that may serve as the primary storage for the data storage device in some configurations. The controller 110 includes a non-volatile cache controller 114 configured to control data transfers to and from a non-volatile cache 140. Note that in some embodiments the non-volatile cache 140 may comprise a portion of memory 120, and the memory controller 112 and non-volatile cache controller 114 may comprise the same or portions of the same physical hardware. The controller 110 includes a torn write mitigation module 115 configured to implement a torn write mitigation scheme that reduces errors in sectors associated with a write operation to the memory 120 that is in progress during a power loss as described in more detail herein.

The memory 120 may comprise any non-volatile memory including rotating magnetic disk memory, magnetic tape, NOR flash, NAND flash, phase-change memory (PCM), non-volatile static random access memory (NvSRAM), battery backed up static random access memory (BBSRAM), magnetic random access memory (MRAM), spin-torque RAM (StRAM), resistive RAM (RRAM) and/or any other type of non-volatile memory. The non-volatile cache 140 may include any of the memory types listed above or others that is suitable for storing data upon loss of host-supplied power. Typically, the non-volatile cache is capable of: 1) retaining the data without externally-supplied power for an extended period of time; and 2) being reliably written to at a rate such that the write operation is completed within the available time after loss of host power, but before the power of the data storage device drops below the point where the non-volatile cache 140 and/or non-volatile cache controller 114 can no longer operate to store data.

The system 100 shown in FIG. 1 shows power monitoring circuitry 151 and optional power backup circuitry 150. The power monitoring circuitry 151 is configured to sense for indication of host-supplied power loss. The power monitoring circuitry 151 may include detection logic that provides an alert in the event of loss of supplied power to the memory and/or other system components. For example, an indication of power loss may be a specified percentage or level of voltage droop of one or more host system power supply voltages, e.g., power supply voltages used for normal operation of the data storage device 100.

FIG. 1 shows optional power backup circuitry 150 configured to extend the amount of time that circuitry the data storage controller, e.g., the memory controller and non-volatile cache controller, and the non-volatile cache retain power. The power backup circuitry 150 may include one or more energy storage devices, e.g., capacitors, supercapacitors, batteries and/or other energy storage devices that are capable of delivering power to the data storage controller 110 and/or non-volatile cache 140 for a specified period of time following the power loss. In implementations that use a rotating disk as the memory, the kinetic energy of the rotating disk may be used to supply the power backup 150, which may also include regulators (not shown) for converting the kinetic energy into power for portions of device 100. In some configurations, the electromotive force (EMF) generated by the rotating disk may be used charge or re-charge a capacitor or battery in the power backup circuitry 150. The power monitor 151 and, optionally, power backup 150, are arranged to detect power loss, to initiate the saving of pertinent torn-write data, and to allow sufficient time to save the data to the non-volatile cache 140. The power loss may have a relatively short transition time from the indication of power loss event to the point at which there is insufficient power to support writing the data and metadata according to the torn write mitigation operation. In systems that employ power backup circuitry, the power loss may have a relatively longer transition, allowing more time to implement the torn write mitigation approaches discussed herein.

As a host write operation is implemented, the sectors being written may reside for a period of time in an intermediate memory or buffer, e.g., located in the memory controller 112 (FIG. 1) or an external DRAM (not shown). The intermediate memory serves the purpose of speed matching between the host interface and the memory data rate among other purposes. Torn write mitigation 115 is logic, often in the form of instructions in a microprocessor, that facilitates the storage or torn-write data to non-volatile cache 140 upon notification of power loss from power monitor 151.

Figure 2:
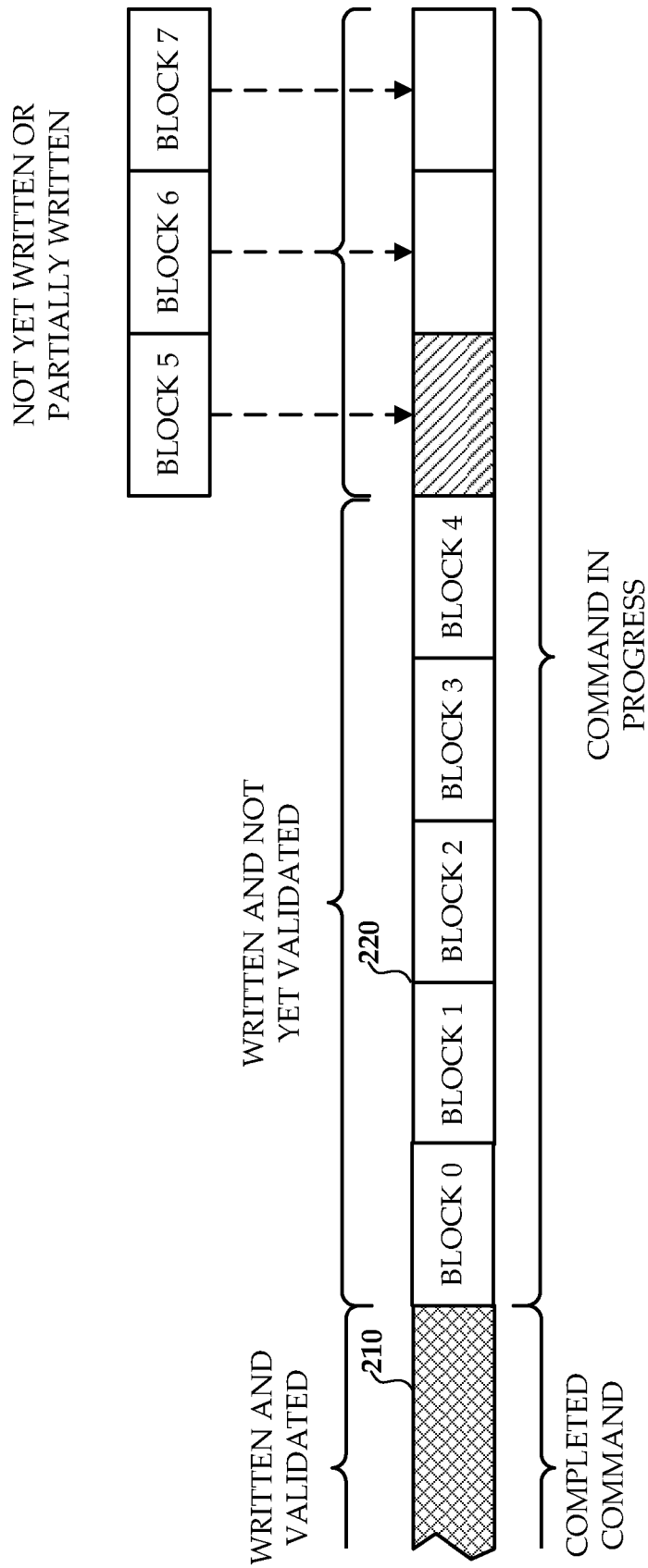
FIG. 2 illustrates sectors being written to a sector of memory at the time a power loss occurs.

FIG. 2 illustrates data being written to memory at the time the power loss occurs. FIG. 2 shows a portion of the memory (which could be sectors of a disk or pages of a flash) 220 that is in the process of being written during a current write operation and a portion of the memory 210 that was written to during a previous write operation. In this example, these portions of the memory 210, 220 are larger than the logical blocks being stored. For example, memory portion 220 could be a 4096 byte sector that can store eight 512 byte host logical blocks.

As depicted in FIG. 2, a write operation is in progress to memory sector 220. Sectors 0-4 have been written to memory 220 and have not yet been validated. Validation of the data involves receiving a feedback signal indicating that the data in the sectors is stored properly to the memory. Sector 5 has been incompletely written and sectors 6-7 have not yet been written to memory. Sectors 5-7 are associated with the write operation for memory portion 220 and are also associated with an outstanding write command.

Consider the torn write scenario that occurs when power loss occurs after sectors 0-4 are written (but not validated), sector 5 is partially written, and sectors 6-7 are not yet written to memory 220. After the power loss occurs, there may not be sufficient time to validate sectors 0-4 and to complete writing and validate sectors 5-7. In this scenario, errors are likely to occur in the data stored in the memory 220.

Depending on the type of memory, in some embodiments, a torn write mitigation process may involve storing blocks 0-5 to the non-volatile cache and optionally storing blocks 6 and 7 to the non-volatile cache. In other embodiments, the memory portions 210, 220, e.g., disk sectors, are "atomic," meaning that the sectors 210, 220 are the smallest unit of memory that can be accessed. In this scenario, the torn write mitigation process would store blocks 0 through 7 to the non-volatile cache.

Figure 3:
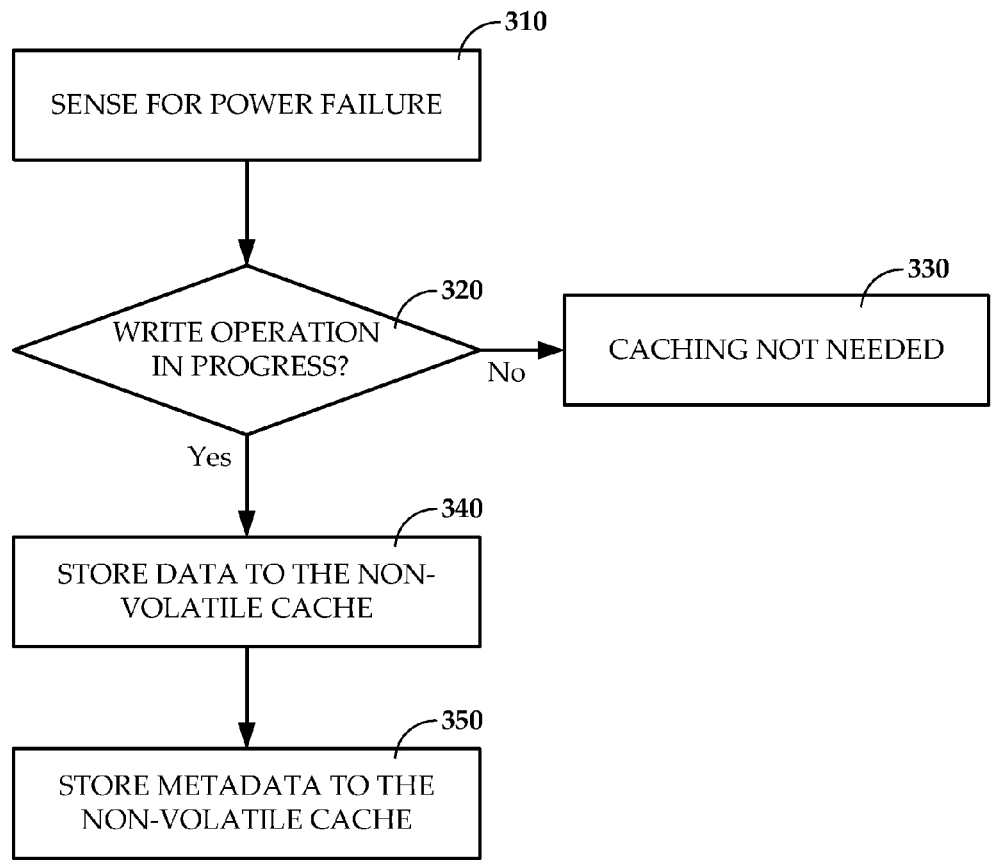
FIG. 3 is a flow diagram illustrating a process for saving data during a torn write mitigation process in accordance with some embodiments.

FIG. 3 is a flow diagram illustrating a torn write mitigation process in accordance with some embodiments that may be implemented data storage device, such as system 100 shown in FIG. 1. The system monitors the power and senses 310 for an indication of loss of power to the data storage device, e.g., power supply voltage droop. In response to detecting the indication of power loss, the torn write mitigation process determines if a write operation is in progress 320 at the time the power loss occurs. If a write operation was not in progress the operation terminates at 330. Not shown, at 330 the device optionally may write metadata indicating that there is nothing to restore. In response to a write operation being in progress 320 the torn write mitigation process determines whether data have been written to the memory, but are not yet validated, e.g., blocks 0-4 in FIG. 2. The torn write mitigation process may inspect state information to identify the not yet validated data. Not yet validated data are blocks or other units of memory that have recently been written to the memory but for which feedback has not yet been received indicating that the data have been properly written. For example, if the memory is a rotating disk, the feedback may be accomplished by servo sample processing to confirm the drive heads are still within on-cylinder limits, among other criteria.

At least data that have been written to memory but not yet validated are stored 340 in the non-volatile cache, e.g., blocks 0-5 shown in FIG. 2. In some embodiments, all blocks of a (atomic) memory sector may be stored in the non-volatile cache, e.g., blocks 0-7 shown in FIG. 2. Metadata that describe the data are also stored 350 in the non-volatile cache. The data and/or metadata may be protected with error detection and/or error correction codes for enhanced robustness.

As part of the power-on sequence, the torn write mitigation module reads metadata from the non-volatile cache to determine if any blocks need restoration. If data exist in non-volatile cache then these data are read from non-volatile cache. Once the memory is in a state at which data can be written to memory, the blocks from non-volatile cache are written to the proper location(s) of memory indicated by the metadata.

Figure 4:
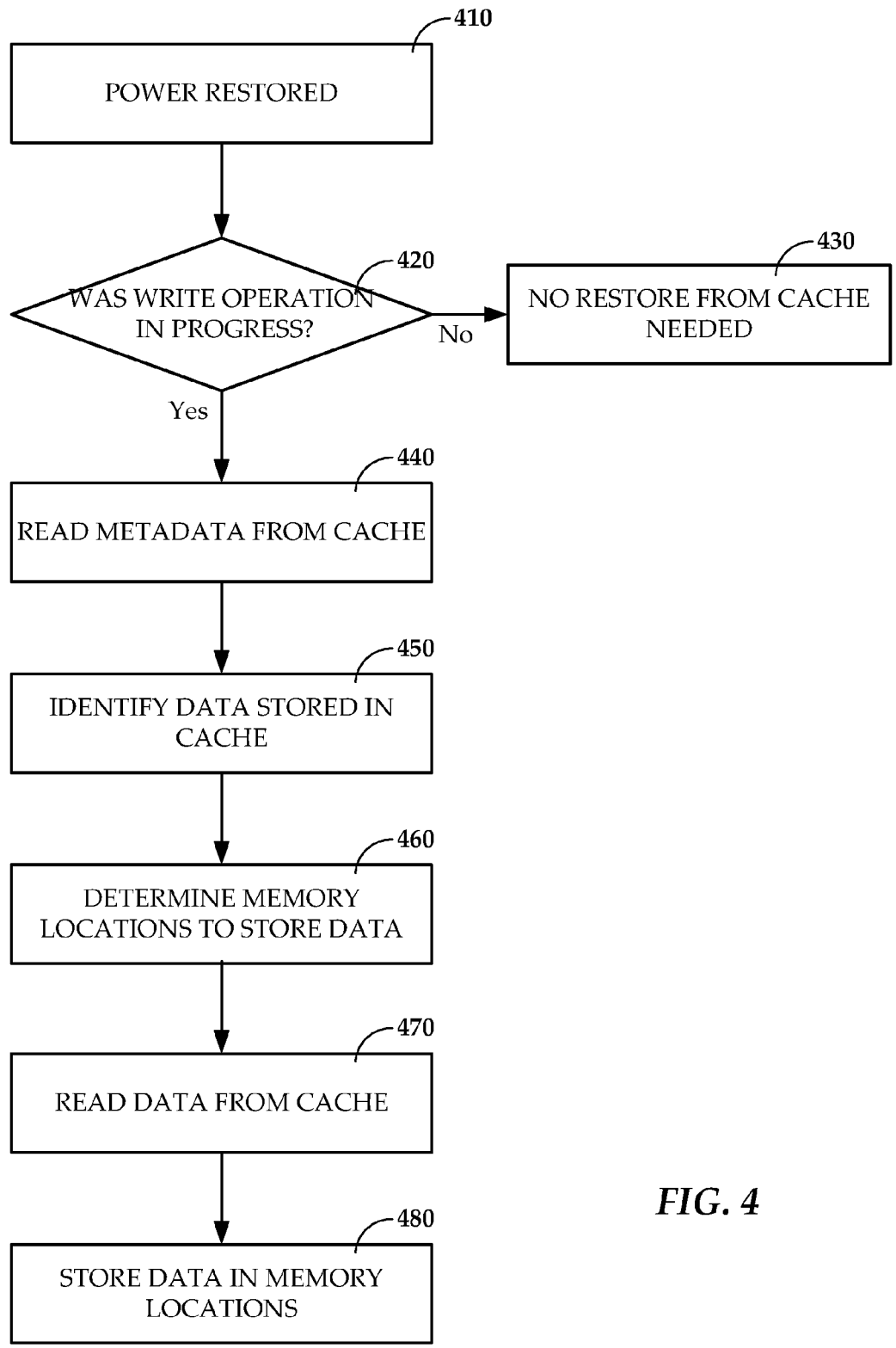
FIG. 4 is a flow diagram illustrating a process for restoring data during a torn write mitigation process in accordance with some embodiments.

FIG. 4 is a flow diagram that illustrates processes of torn write mitigation that occurs after system power is restored 410. The torn write mitigation module determines 420 if a memory write operation was in progress at the time that the loss of power occurred. If not, there is no need to restore 430 the data from the non-volatile cache.

In response to determining 420 that a write operation was in progress when the loss of power occurred, the torn write mitigation module reads 440 metadata from the non-volatile cache. The data (e.g. logical blocks/sectors/pages) stored in the non-volatile cache are identified 450 from the metadata. The torn write mitigation module also identifies 460 from the metadata at least one location (e.g., at least one logical block address) where the data were to be stored in the memory. The data are read 470 from the non-volatile cache and are written 480 to the memory at the location indicated by the metadata.

As previously discussed, data may exist in more than one place in a data storage device, e.g., data could be redundantly stored in both magnetic media and flash on a hybrid drive. Data storage approaches that provide for torn write mitigation can be useful to protect data associated with a write operation that are not redundantly stored in a non-volatile memory. In these scenarios, data associated with a write operation are not stored to the cache if the data are redundanctly stored.

In some configurations, torn write mitigation can be used, for example, to protect data that are associated with a background repair activity that involves re-writes of data. For example, a data storage device may perform a background scan of the media, searching for blocks with many bit errors and may rewrite the data to memory to improve the quality of the stored data. If this process is interrupted by the loss of power, the torn-write mitigation system can also be used by following the same procedure as with host data blocks.

Torn write mitigation processes described herein may involve tracking the progress of the write operation as data are written to the memory. At the time of the power loss, data associated with the write operation that have been written to the memory but have not yet been validated are "torn," making the data unrecoverable from the memory in the absence of torn write mitigation. Data involved in the torn write mitigation process may include, for example, blocks that have been written to the memory and are not yet validated and blocks that are in the process of being written to the memory. Data involved in the torn write mitigation process may also include blocks that have not yet been written but would be included in an atomic memory sector. Tracking the progress of the write operation allows the torn write mitigation process to identify the torn data. These torn blocks are stored in the non-volatile cache along with associated metadata.

Figure 5:
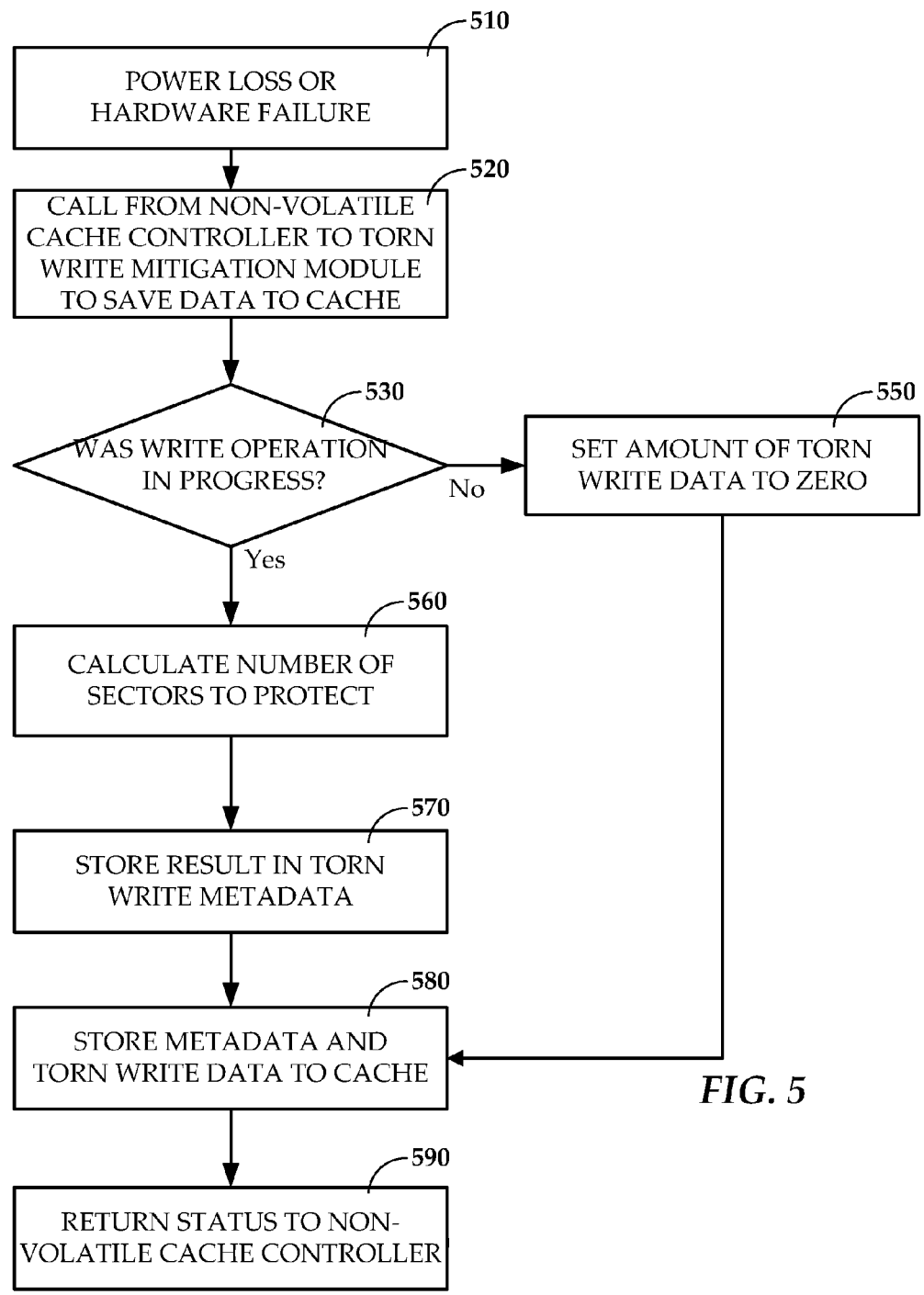
FIG. 5 is a flow diagram illustrating a process for saving data during a torn write mitigation process in accordance with some embodiments.

FIG. 5 is a flow diagram of a torn write mitigation process in accordance with some embodiments. The process illustrated in FIG. 5 may be implemented, for example, by the system 100 of FIG. 1. The power monitor 151 (see, FIG. 1) monitors 510 the system power for indication of power loss or other types of faults that would interrupt a write operation resulting in torn data requiring protection. Examples of other types of faults would be catastrophic error conditions, such as the expiration of system watchdog timers, a motor out of speed error (e.g. on a HDD), or a detected backup power supply failure (e.g. on a SSD). When a power loss or other catastrophic error condition is detected, the non-volatile cache controller 114 (shown in FIG. 1) issues 520 a call to the torn write mitigation module 115 (shown in FIG. 1) to save torn write data to the non-volatile cache 140 (shown in FIG. 1). The torn write mitigation module determines 530 if a write operation was in progress at the time of the loss of power or memory failure. If there was no write operation in progress, then the amount of data saved is set 550 to zero in the metadata and the metadata (with no data) are saved 580 to the non-volatile cache.

In response to determining 530 that a write operation was in progress at the time of the loss of power, the amount of torn write data, e.g., number of blocks or other data units, to save is determined 560 by the torn write mitigation module. The metadata are updated 570 to include at least one memory location of the data that are being saved to non-volatile cache. The metadata and data are saved 580 in the non-volatile cache. The status of the torn write mitigation process indicating that the metadata and data have been saved is returned 590 to the non-volatile cache controller.

In some embodiments, there may be memory sectors that have been flagged so that they are skipped during any memory write operation. Write operations can include skip mask commands that prevent storage of data to skipped sectors. In embodiments that take into account skipped sectors, the metadata stored as a part of the torn write mitigation process may include additional fields that are added to identify these skipped memory sectors.

Figure 6:
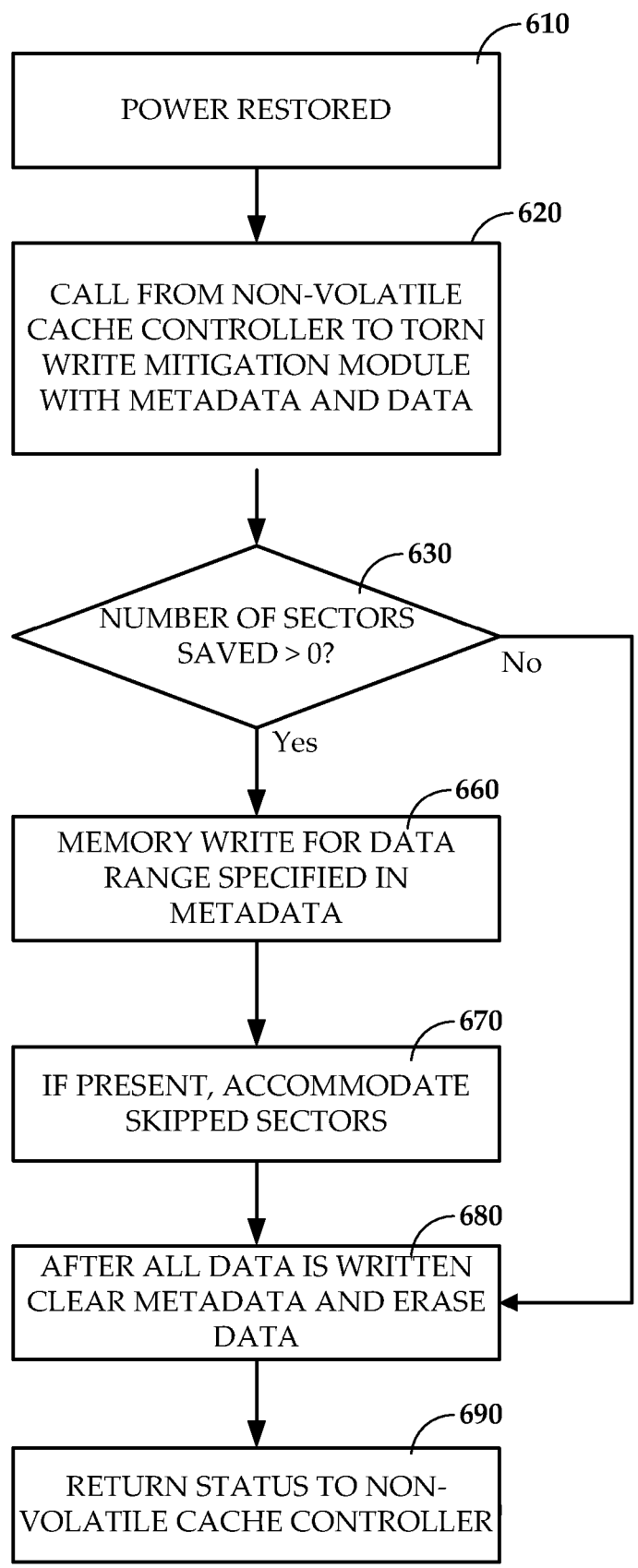
FIG. 6 is a flow diagram illustrating a process for restoring data during a torn write mitigation process in accordance with some embodiments.

FIG. 6 is a flow diagram of a torn write mitigation process that can be implemented in response to restoration of power to the memory 120 (FIG. 1). In response to restoration 610 of power to the memory 140 (FIG. 1), the non-volatile cache controller 114 (FIG. 1) issues 620 a call to the torn write mitigation module 115 (FIG. 1) with stored metadata and data. From the metadata included in the call, the torn write mitigation module determines 630 if the number dat unit, e.g., blocks/sectors/pages saved during the torn write mitigation process is greater than zero. If the number of saved data units is not greater than zero, the torn write mitigation module clears 680 the metadata and returns 690 status to the non-volatile cache controller.

In response to the number of saved data units being greater than zero, the torn write mitigation module causes the data to be written 660 to the memory at the location and data range specified by the metadata. In embodiments that account for skipped sectors, special processing may be used if skip mask fields are present in the metadata. For example, more elaborate metadata that includes the skip mask pattern may be stored 670. After all data are restored 680 to the memory, the metadata are cleared and the data are erased from the non-volatile cache. The status is returned 690 to the non-volatile cache controller.

Figure 7:
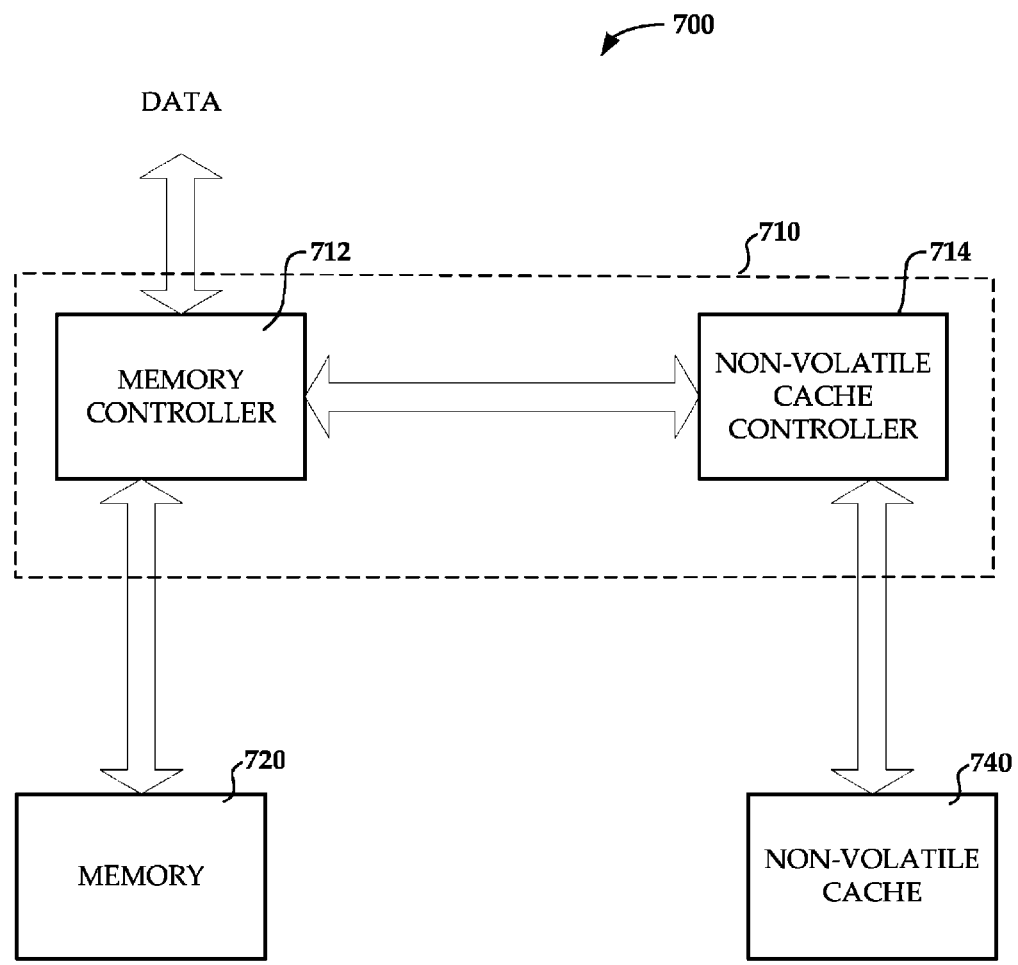
FIG. 7 is a block diagram of a system capable of implementing a torn write mitigation process in accordance with some embodiments.

FIG. 7 is a block diagram of a system 700 capable of mitigating torn data write errors in accordance with some embodiments. Data blocks (or other units of data) written to memory 720 are transferred from a host or elsewhere (not shown in FIG. 7) to a data storage controller 710. The data storage controller 710 includes a memory controller 712 configured to control data transfers to and from a memory 720. The data storage controller 710 includes a non-volatile cache controller 714 configured to control data transfers to and from a non-volatile cache 740. In this embodiment, the write operation for the sectors and associated metadata for the write operation move through the non-volatile cache 740 for every write operation to memory 720. Thus, in the event of a power loss, the not yet validated data blocks, incompletely written data blocks, and/or not-yet written data blocks are retained in the non-volatile cache 740. The configuration shown in FIG. 7 eliminates the need for power loss monitoring and/or power backup circuitry.

Embodiments disclosed herein include methods for implementing torn write mitigation. For example, a torn write mitigation method includes detecting a loss of host-supplied power event or catastrophic failure that affects system memory. In response to a write operation to the memory being in progress at or about such a time, data associated with the write operation are stored to a non-volatile cache along with metadata that include address location information for the data. A write operation to the memory may store multiple logical blocks to one or more memory sectors or pages. The data associated with the write command that is stored to the non-volatile cache includes torn write data and metadata.

The non-volatile cache is selected such that the non-volatile cache is capable of retaining the data without externally-supplied power for an extended period of time, and can be reliably written to at a rate such that the write operation is completed within the available time after loss of system power. In some configurations, the memory comprises a rotating magnetic disk and the non-volatile cache comprises flash memory.

In some configurations, the torn write data and/or metadata are encoded using an error detecting and/or error correcting code prior to storing torn write data and/or metadata in the non-volatile cache. In some configurations, the metadata may be stored in a header section of the stored data. A field of the metadata may indicate the amount of data that is stored in the non-volatile cache, e.g., the number of sectors stored. In the scenario where there is no torn data to store to the non-volatile cache (e.g., no write operation in progress at the time of the power loss) the metadata field indicating the amount of data stored is set to zero.

After the power is restored and the memory can accept data, the torn write mitigation process determines if a write command to memory was in progress at the time of the power loss. In response to a write command being in progress at the time of the power loss, the metadata and torn write data are retrieved from the non-volatile cache. The metadata are used to identify where the torn write data should be restored to the memory. The torn write data are written to the memory.

Some torn write mitigation methods involve determining if a write command is active at the time of the power loss and if the write command includes non-redundant data. If the data of the write operation are redundant, the data are not stored to the non-volatile cache. In response to a write command being in progress that includes non-redundant data, the non-redundant data are stored to a non-volatile cache along with metadata that include information about the non-redundant data. For example, the metadata may include at least one logical block address of the memory where the torn write data (the non-redundant data) are to be restored. The metadata may also include storing information about skipped sectors of the memory, and other information.

In some configurations, the memory is a rotating magnetic disk and the torn write mitigation process includes tracking the positions of the magnetic disk during execution of the write operation. The position of the disk wherein the write operation stops during a power loss is identified and the number of sectors that need to be stored to the non-volatile cache are determined using the stop position.

In some implementations, the method includes determining if repair activity is active at the time of the power loss. If the repair activity is active, the non-redundant data associated with the repair activity are stored to the cache. A repair activity for example could be a background media scan activity that searches for weak or poorly written sectors or pages. The media scan might try rewriting the weak sectors/pages to rejuvenate them. If power is lost during this activity, the torn write system can be used to prevent data loss.

After power is restored, the metadata are read from the non-volatile cache and is used to determine if non-redundant data were stored to the non-volatile cache at the time of the power loss. In response to non-redundant data being stored to the non-volatile cache during the power loss, one or more locations of the memory to which the non-redundant data should be restored are identified. The non-redundant data are retrieved from the non-volatile cache and is read from the non-volatile cache is and restored to the locations of the memory.

In some configurations, determining if the non-redundant data were stored to the cache comprises reading a field of the metadata that indicates the number sectors stored to the non-volatile cache. The process includes determining that non-redundant data were stored to the non-volatile cache if the field of the metadata is set to a non-zero value. In some configurations, restoring the non-redundant data to the locations of the memory comprises restoring the non-redundant data using the information about skipped sectors. After the non-redundant data are restored, the metadata are reset and the non-redundant data are erased from the non-volatile cache.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing torn write mitigation in data storage devices as described above.

It is also worth noting that the descriptions in this disclosure were written for block storage devices, such as hard disk drives and solid state drives, because these devices are commonplace. These same concepts are also applicable to devices that store data (e.g. as objects) instead of blocks.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method, comprising:
    detecting a power loss to a memory;
    in response to a write operation to the memory being in progress at or about a time of the power loss,
    determining if write data corresponding to torn write data are redundantly stored, the torn write data comprising data left in a degraded, unverified, or uncorrectable state as a result of the power loss;

storing the write data and metadata that describes the write data to a non-volatile cache in response to the write data not being redundantly stored; and not storing the write data and the metadata to the non-volatile cache in response to the write data being redundantly stored.

2. The method of claim 1, wherein storing the write data comprises providing backup power while storing the write data to the non-volatile cache.

3. The method of claim 1, wherein the write data further comprises one or more sectors of data that were scheduled to be written to the memory and had not yet been written to the memory prior to the power loss.

4. The method of claim 1, wherein:
the memory comprises one or more of a rotating magnetic disk, magnetic tape, NOR flash, non-volatile static random access memory (NVSRAM), NAND flash, magnetoresistive random access memory (MRAM), phase change memory (PCM), spin torque random access memory (STRAM), resistive random access memory (RRAM), and battery backed RAM; and
the non-volatile cache comprises one or more of NOR flash, NVSRAM, NAND flash, MRAM, PCM, STRAM, RRAM and battery backed RAM.

5. The method of claim 1, further comprising reading the write data from the non-volatile cache and writing the write data to the memory after power is restored.

6. The method of claim 1, further comprising, after power is restored:
reading the metadata from the non-volatile cache;
identifying a location of the memory to restore the write data using the metadata; and
re-writing the write data to the location of the memory.

7. The method of claim 1, wherein storing the write data comprises identifying sectors that have been written to the memory but for which a feedback signal was not generated indicating that the sectors are recoverable.

8. The method of claim 7, wherein the feedback signal is based on servo sample processing that confirms drive heads of the memory are within track on cylinder limits.

9. The method of claim 1, wherein:
storing the metadata comprises storing information about skipped sectors of the memory; and
further comprising, after power is restored, restoring the write data from the non-volatile cache to the memory using the information about the skipped sectors.

10. The method of claim 1, wherein the memory comprises a magnetic disk and further comprising tracking positions of the magnetic disk during execution of a write command.

11. The method of claim 10, wherein tracking the positions comprises:
identifying a stop position where the write operation stops during the power loss; and
further comprising calculating an amount of the write data to store to the non-volatile cache using the stop position.

12. The method of claim 1, further comprising:
determining if a repair activity is active at the time of the power loss; and
if the repair activity is active, storing data associated with the repair activity to the non-volatile cache.

13. An apparatus, comprising:
torn write mitigation circuitry configured to
determine if a write operation to memory is in progress at a time of a power loss, and
in response to the write operation being in progress at the time of the power loss,
determine if write data corresponding to torn write data are redundantly stored, the torn write data comprising data left in a degraded, unverified, or uncorrectable state as a result of the power loss,
store the write data and metadata to a non-volatile cache in response to the write data not being redundantly stored, the metadata describing the write data, and
not store the write data and the metadata to the non-volatile cache in response to the write data being redundantly stored.

14. The apparatus of claim 13, wherein the metadata are stored in a header of the write data and a field of the metadata indicates an amount of the write data that have been stored in the non-volatile cache.

15. The apparatus of claim 13, wherein the write mitigation circuitry is further configured to encode at least one of the write data and the metadata using an error detection or error correction code before the write data and metadata are stored in the non-volatile cache.

16. A system, comprising:
a memory;
a non-volatile cache;
power loss detection circuitry configured to detect a loss of host-supplied power; and
torn write mitigation circuitry configured to:
determine if a write operation to the memory is in progress at or about the time of a power loss, and
in response to the write operation being in progress at the time of the power loss,
determine if write data corresponding to torn write data are redundantly stored, the torn write data comprising data left in a degraded, unverified, or uncorrectable state as a result of the power loss,
store the write data and metadata to a non-volatile cache in response to the write data not being redundantly stored, the metadata describing the write data, and
not store the write data and the metadata to the non-volatile cache in response to the write data being redundantly stored.

17. The system of claim 16, wherein the non-volatile cache is capable of retaining the write data without externally-supplied power for an extended period of time and is capable of being reliably written to at a rate such that storage of the write data to the non-volatile cache is completed within an available time after the power loss.

18. The system of claim 16, wherein:
the system is a solid state drive storage device;
the memory comprises multi-level cell (MLC) NAND flash; and
non-volatile cache comprises a portion of the MLC NAND flash operated in single level cell mode.

19. The system of claim 16, wherein:
the system is a hard disk drive;
the memory is a rotating magnetic disk; and
the non-volatile cache is an electronic flash memory.

* * * * *